(12) United States Patent
Cariou et al.

(10) Patent No.: US 10,251,072 B2
(45) Date of Patent: Apr. 2, 2019

(54) SECTORIZED ANTENNAS FOR UNSYNCHRONIZED MULTIUSER MULTIPLE-INPUT AND MULTIPLE-OUTPUT

(71) Applicants: Laurent Cariou, Portland, OR (US); Solomon Trainin, Haifa (IL); Ou Yang, Santa Clara, CA (US)

(72) Inventors: Laurent Cariou, Portland, OR (US); Solomon Trainin, Haifa (IL); Ou Yang, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 261 days.

(21) Appl. No.: 15/197,167

(22) Filed: Jun. 29, 2016

(65) Prior Publication Data
US 2018/0006379 A1  Jan. 4, 2018

(51) Int. Cl.
*H04W 16/28* (2009.01)

(52) U.S. Cl.
CPC .................................. *H04W 16/28* (2013.01)

(58) Field of Classification Search
CPC ....... H01Q 13/106; H01Q 1/243; H01Q 21/00
USPC ..................................................... 343/700 MS
See application file for complete search history.

(56) References Cited

U.S. PATENT DOCUMENTS 8,988,298 B1 * 3/2015 Akhoondzadehasl ......................
H01Q 21/00
343/700 MS

* cited by examiner

*Primary Examiner* — Andrea Lindgren Baltzell
(74) *Attorney, Agent, or Firm* — Eversheds Sutherland (US) LLP

(57) ABSTRACT

This disclosure describes systems, methods, and devices related to antenna adjustment for unsynchronized MU-MIMO communication. A device may determine a first signal associated with a first antenna of the device. The device may determine a second signal associated with a second antenna of the device. The device may cause to send the first signal and the second signal to one or more first devices. The device may identify a feedback message from at least one of the one or more first devices. The device may determine one or more antenna adjustments associated with at least one of the first antenna or the second antenna.

17 Claims, 8 Drawing Sheets

FIGs. 3A-B

SECTORIZED ANTENNAS FOR UNSYNCHRONIZED MULTIUSER MULTIPLE-INPUT AND MULTIPLE-OUTPUT

TECHNICAL FIELD

This disclosure generally relates to systems and methods for wireless communications and, more particularly, to sectorized antennas for unsynchronized multiuser multiple-input and multiple-output (MU-MIMO) communications.

BACKGROUND

Wireless devices are becoming widely prevalent and are increasingly requesting access to wireless channels. A wireless communication network in a millimeter-wave band may provide high-speed data access for users of wireless communication devices. Beamforming represents techniques that can be used for enhancing throughput and range in wireless networks, including but not limited to the next generation 60 GHz (NG60) network.

DETAILED DESCRIPTION

Figure 1:
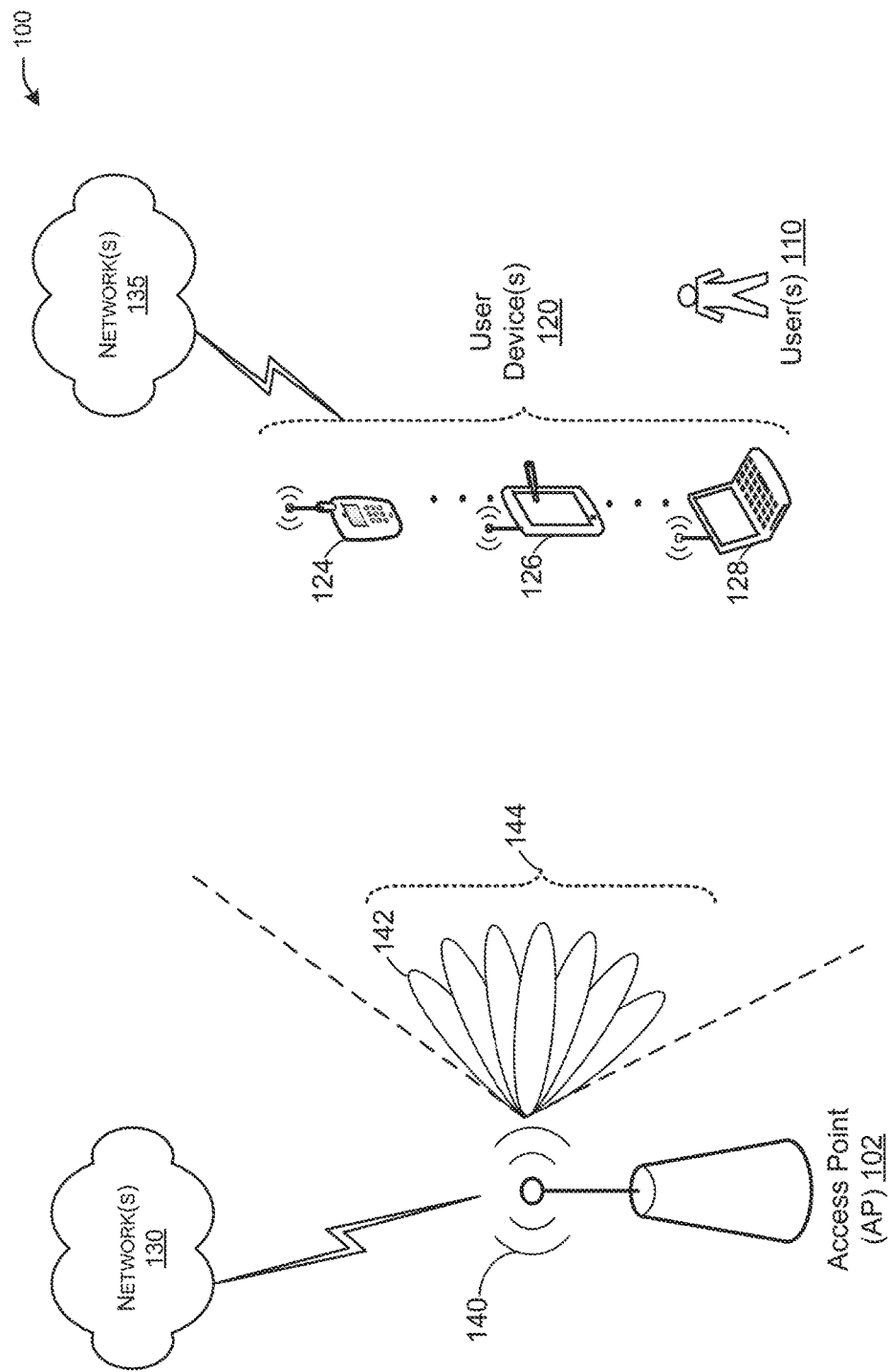
FIG. 1 depicts a network diagram illustrating an example network environment for antenna adjustment for unsynchronized multiuser multiple-input and multiple-output (MU-MIMO) communications, in accordance with one or more example embodiments of the present disclosure.

Example embodiments described herein provide certain systems, methods, and devices for adjusting sectorized antennas for unsynchronized multiuser multiple-input and multiple-output (MU-MIMO) communications between Wi-Fi devices in various Wi-Fi networks.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

During communication between two devices, one or more frames may be sent and received. These frames may include one or more fields (or symbols) that may be based on IEEE 802.11 specifications, including, but not limited to, an IEEE 802.11ad specification or an IEEE 802.11ay specification.

In some IEEE 802.11 specifications, devices may operate in multiuser multiple-input and multiple-output (MU-MIMO) technology. It is understood that MIMO facilitates multiplying the capacity of a radio link using multiple transmit and receive antennas to exploit multipath propagation. MIMO provides a practical technique for sending and receiving more than one data signal on the same radio channel at the same time via multipath propagation. MU-MIMO provides a way for wireless devices to communicate with each other using multiple antennas such that the wireless devices may transmit at the same time and frequency and still be separated by their spatial signatures. For example, using MU-MIMO technology, an access point (AP) may be able to communicate with multiple devices using multiple antennas at the same time to send and receive data. An AP operating in MU-MIMO and in a 60 GHz frequency band may utilize an MU-MIMO frame to communicate with devices serviced by that AP. The AP may communicate with devices in a synchronized MU-MIMO operation, where the AP simultaneously transmits to multiple devices in a frame that starts and ends at the same time.

To increase or widen the coverage area such that the number of served clients is maximized, multiple sector antennas may be configured on a device (e.g., AP and/or STAs). The multiple sector antennas may allow, for example, an AP to serve devices based on the number of sectors that may be covered by each antenna of the AP. For example, an AP, with three antennas having each a 120-degree sector, may provide coverage around the AP such that the devices located around the AP may be served by the AP.

In some instances, during the deployment of an AP, the sectors may be defined for the antennas of the AP. However, next generation NG60 does not support unsynchronized MU-MIMO operations for point-to-multipoint simultaneous transmissions between an AP with multiple antennas and multiple user devices, where each device is addressed separately by the AP.

Example embodiments of the present disclosure relate to systems, methods, and devices for antenna adjustment for unsynchronized MU-MIMO communications during communication between one or more devices.

In some demonstrative embodiments, one or more devices may be configured to communicate an MU-MIMO frame, for example, over a 60 GHz frequency band. The one or more devices may be configured to communicate in a mixed environment such that one or more legacy devices are able to communicate with one or more non-legacy devices. That is, devices following one or more IEEE 802.11 specifications may communicate with each other regardless of which IEEE 802.11 specification is followed.

Directional multi-gigabyte (DMG) communications may involve one or more directional links to communicate at a rate of multiple gigabits per second, for example, at least 1 gigabit per second, 7 gigabits per second, or any other rate. An amendment to a DMG operation in a 60 GHz band, e.g., according to an IEEE 802.11ad standard, may be defined, for example, by an IEEE 802.11ay project.

In some demonstrative embodiments, one or more devices may be configured to communicate over a next generation 60 GHz (NG60) network, an extended DMG (EDMG) network, and/or any other network. For example, the one or more devices may be configured to communicate over the NG60 or EDMG networks.

In one embodiment, an unsynchronized MU-MIMO system may enable directionality of one or more antennas. That is, a transmission link between an antenna from the AP and one station (STA) may be established independently with respect to another link from another antenna from the AP and another STA. This may enable the AP to perform scheduling and interference coordination between one or more STAs using different sectors associated with the one or more antennas.

In one embodiment, an unsynchronized MU-MIMO system may facilitate coordination between different sectors at a medium access control (MAC) layer independently from each other. That is the unsynchronized MU-MIMO system may facilitate the independent communication between an AP and multiple STAs using multiple antennas.

In one embodiment, an unsynchronized MU-MIMO system may be configured to facilitate dynamically setting angles of one or more antennas (e.g., pseudo-quasi-omni angles) of each sectorized antenna of the one or more antennas based at least in part on feedback received from the multiple STAs. For example, the pseudo-quasi-omni angles may be set based at least in part on feedback (e.g., measurements) from one or more STAs that may be associated with the AP.

In one embodiment, the unsynchronized MU-MIMO system may reduce the overlap in one or more quasi-omni areas that may be covered by different sectorized antennas.

In one embodiment, the unsynchronized MU-MIMO system may facilitate adjusting angles of one or more antennas (e.g., pseudo-quasi-omni angles) in order to manipulate and reduce the overlap in the one or more quasi-omni areas. Consequently, interference may be reduced to favor reuse between sectorized antennas.

In one embodiment, the angles of one or more antennas may be preconfigured before deployment of a device (e.g., AP and/or an STA). However, the deployment environment has some influence on the overlap between the sectorized antennas. Once deployed, it may be difficult to adjust the angle of an antenna. It should be understood that each STA is associated with one antenna in relation to an AP and may not be able to measure the interference it may receive from the other antennas of another AP.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment for antenna adjustment for unsynchronized MU-MIMO communications, according to some example embodiments of the present disclosure. Wireless network 100 may include one or more user device(s) 120 and one or more access point(s) (AP) 102, which may communicate in accordance with IEEE 802.11 communication standards, such as the IEEE 802.11ad and/or IEEE 802.11ay specifications. The user device(s) 120 may be mobile devices that are non-stationary and do not have fixed locations.

Figure 6:
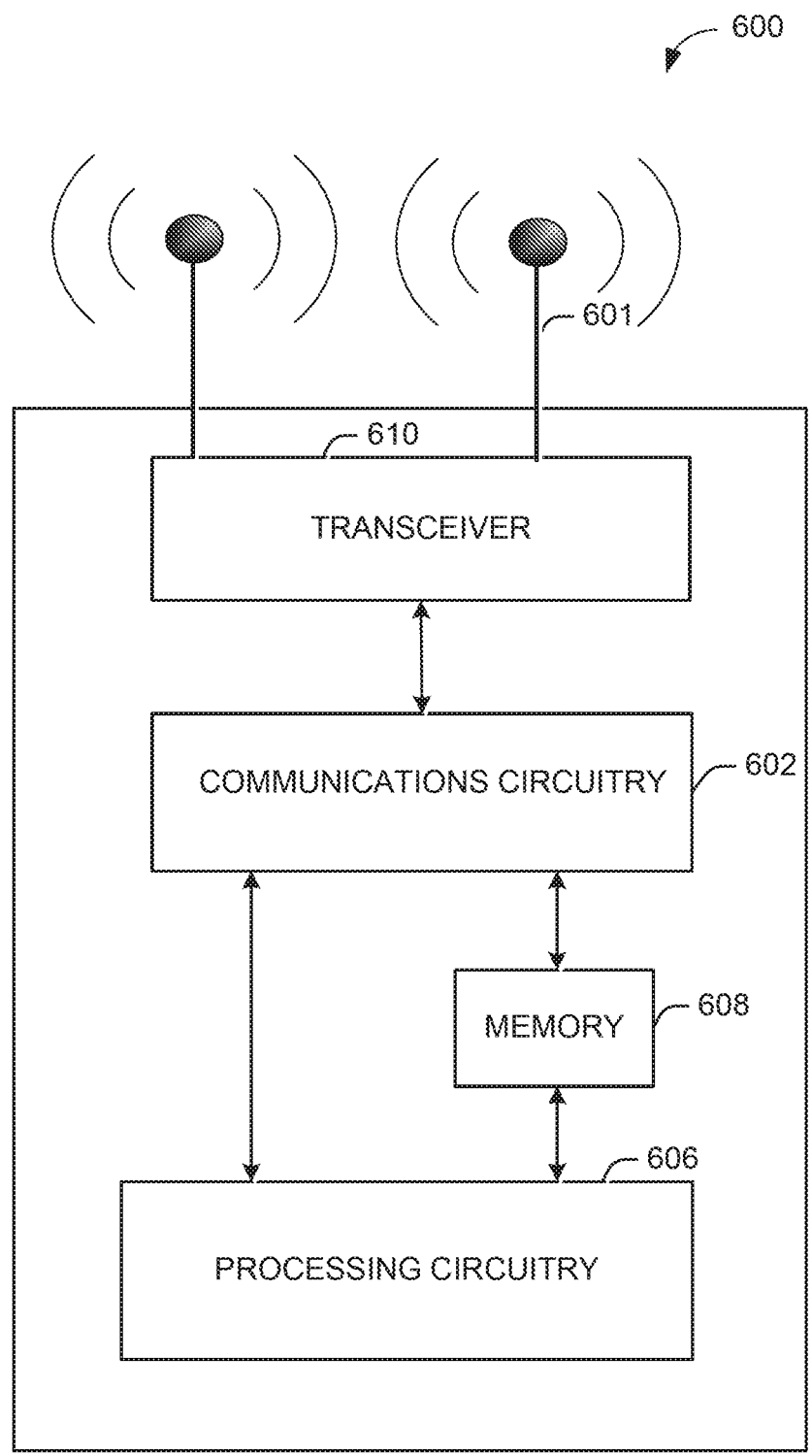
FIG. 6 illustrates a functional diagram of an example communication station that may be suitable for use as a user device, in accordance with one or more example embodiments of the present disclosure.
Figure 7:
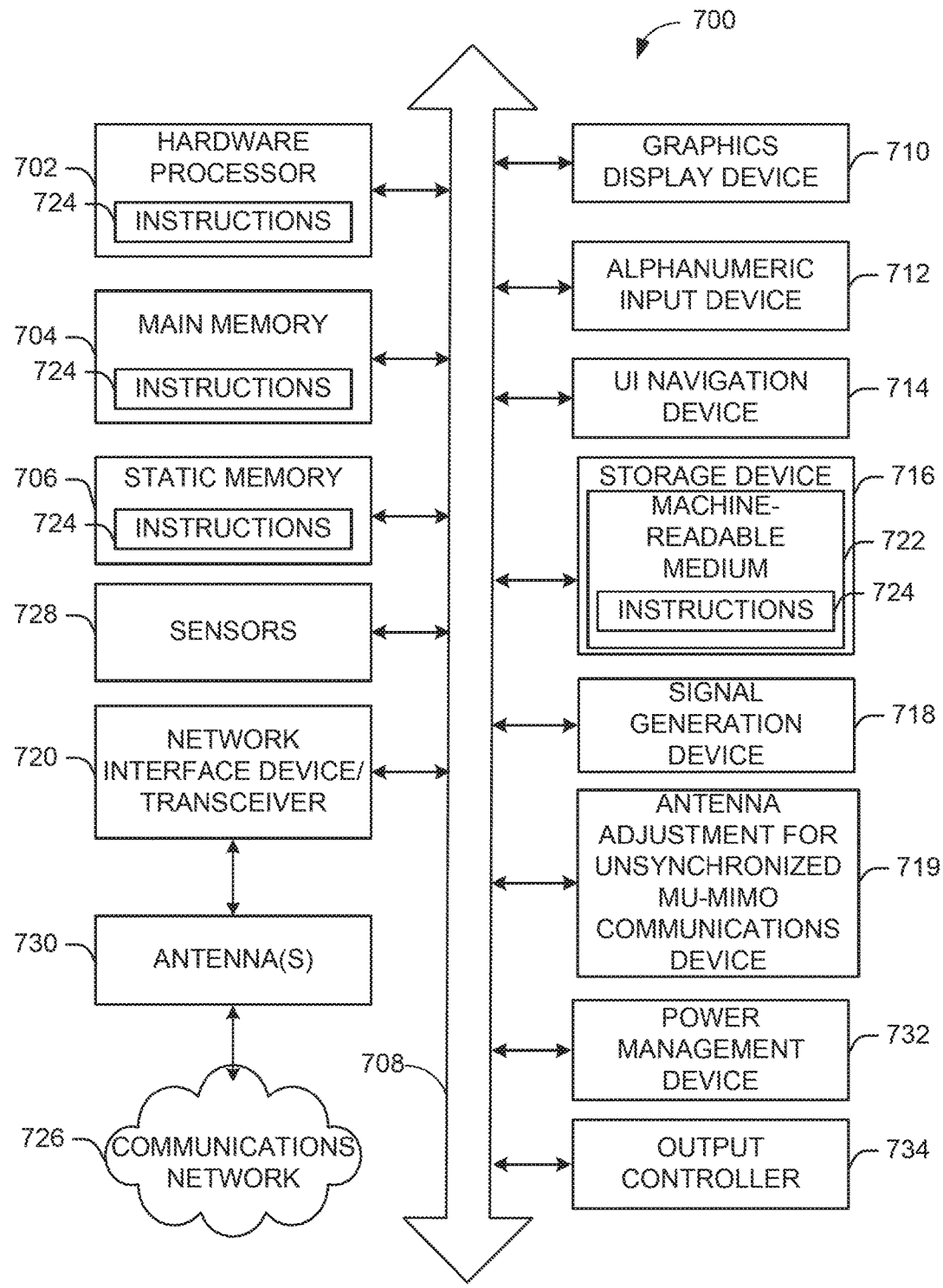
FIG. 7 is a block diagram of an example machine upon which any of one or more techniques (e.g., methods) may be performed, in accordance with one or more example embodiments of the present disclosure.

In some embodiments, the user device(s) 120 and the AP 102 may include one or more computer systems similar to that of the functional diagram of FIG. 6 and/or the example machine/system of FIG. 7.

One or more illustrative user device(s) 120 and/or the AP 102 may be operable by one or more user(s) 110. The user device(s) 120 (e.g., 124, 126, or 128) and/or the AP 102 may include any suitable processor-driven device including, but not limited to, a mobile device or a non-mobile, e.g., a static, device. For example, the user device(s) 120 and/or the AP 102 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

Any of the user device(s) 120 (e.g., user devices 124, 126, 128), and the AP 102 may be configured to communicate with each other via one or more communications networks 130 and/or 135 wirelessly or wired. Any of the communications networks 130 and/or 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and the AP 102 may include one or more communications antennas 140. The one or more communications antennas 140 may be any suitable type of antennas corresponding to the communications protocols used by the user device(s) 120 (e.g., user devices 124, 126 and 128), and the AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or the AP 102.

Any of the user device(s) 120 (e.g., user devices 124, 126, 128), and the AP 102 may be configured to perform directional transmission and/or directional reception in conjunction with wirelessly communicating in a wireless network. Any of the user device(s) 120 (e.g., user devices 124, 126, 128), and the AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and the AP 102 may be configured to perform any given directional transmission towards one or more defined transmit sectors. Any of the user device(s) 120 (e.g., user devices 124, 126, 128), and the AP 102 may be configured to perform any given directional reception from one or more defined receive sectors.

MIMO beamforming in a wireless network may be accomplished using RF beamforming and/or digital beamforming. In some embodiments, in performing a given MIMO transmission, the user devices 120 and/or the AP 102 may be configured to use all or a subset of its one or more communications antennas to perform MIMO beamforming.

Any of the user devices 120 (e.g., user devices 124, 126, 128), and the AP 102 may include any suitable radio and/or transceiver for transmitting and/or receiving radio frequency (RF) signals in the bandwidth and/or channels corresponding to the communications protocols utilized by any of the user device(s) 120 and the AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad). In some embodiments, non-Wi-Fi protocols may be used for communications between devices, such as Bluetooth, dedicated short-range communication (DSRC), ultra-high frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

Some demonstrative embodiments may be used in conjunction with a wireless communication network communicating over a frequency band of 60 GHz. However, other embodiments may be implemented utilizing any other suitable wireless communication frequency bands, for example, an extremely high frequency (EHF) band (the millimeter wave (mmWave) frequency band), a frequency band within the frequency band of between 20 GHz and 300 GHz, a WLAN frequency band, a WPAN frequency band, a frequency band according to the WGA specification, and the like.

An antenna for a radio transmitter converts signals into electromagnetic waves to be transmitted to a receiving device. Any antenna that transmits can also receive. A transmitting antenna may generate stronger electromagnetic waves in some directions than other antennas. The antenna may radiate waves of a different amplitude and phase, and each of these waves travels a different distance to the point where a receiving device is located. In some directions, these waves add constructively to give a gain. In some directions, these waves cause interference and a loss of gain. An omnidirectional antenna may be an antenna that has a non-directional pattern (circular pattern) in a given plane with a directional pattern in any orthogonal plane. An omnidirectional antenna may have a wider angle to allow communication with multiple devices.

In communications, beamforming is used to point an antenna at the signal source to reduce interference and improve communication quality. In direction finding applications, beamforming can be used to steer an antenna to determine the direction of the signal source.

The direction of beams may be controlled by varying the angle of the beam pattern, by modifying the orientation of the antenna, or by polarization. In beamforming, both the amplitude and phase of each antenna element may be controlled. Combined amplitude and phase control may be used to adjust various wave levels and directions. The beams may be arranged in a beam pattern that may be defined by an angle that determines the area that the beams may be directed to. For example, the beams of one antenna may have a beam pattern associated with an angle of 120 degrees, 90 degrees, 60 degrees, etc. The angle may be considered an antenna sector. The angle may be varied in order to increase or decrease the area covered by the beam pattern and hence change the antenna sector. For example, increasing the angle may increase the area of the beam pattern and lowering the angle may decrease the area of a beam pattern.

Polarization of an antenna may be the polarization of the radiated fields produced by an antenna, evaluated in the far field. For an electromagnetic wave, the polarization is effectively the plane in which the electric wave vibrates. Antennas are sensitive to polarization, and generally only receive or transmit a signal with a particular polarization. For example, a horizontally polarized antenna will not communicate with a vertically polarized antenna. A vertically polarized antenna transmits and receives vertically polarized fields. Consequently, if a horizontally polarized antenna is trying to communicate with a vertically polarized antenna, there may be no reception.

The phrases "directional multi-gigabit (DMG)" and "directional band (DBand)", as used herein, may relate to a frequency band wherein the channel starting frequency is above 45 GHz. In one example, DMG communications may involve one or more directional links to communicate at a rate of multiple gigabits per second, for example, at least 1 gigabit per second, 7 gigabits per second, or any other rate.

In some demonstrative embodiments, the user device(s) 120 and/or the AP 102 may be configured to operate in accordance with one or more specifications, including one or more IEEE 802.11 specifications, (e.g., an IEEE 802.11ad specification, an IEEE 802.11ay specification, and/or any other specification and/or protocol). For example, an amendment to a DMG operation in the 60 GHz band, according to an IEEE 802.11ad standard, may be defined, for example, by an IEEE 802.11ay project.

In some demonstrative embodiments, the AP 102 and/or the antenna 140 may be configured to implement one or more mechanisms to extend a single-channel BW scheme (e.g., according to the IEEE 802.11ad specification) for higher data rates and/or increased capabilities.

Some specifications (e.g., an IEEE 802.11ad specification) may be configured to support a single user (SU) system, in which a station (STA) cannot transmit frames to more than a single STA at a time. Such specifications may not be able to support an STA transmitting to multiple STAs simultaneously, using a multi-user MIMO (MU-MIMO) scheme (e.g., a downlink (DL) MU-MIMO), or any other MU scheme.

In some demonstrative embodiments, the user device(s) 120 and/or the AP 102 may be configured to implement one or more multi-user (MU) mechanisms. For example, the user device(s) 120 and/or the AP 102 may be configured to implement one or more MU mechanisms, which may be configured to enable MU communication of downlink (DL) frames using a multiple-input and multiple-output (MIMO) scheme between a device (e.g., AP 102) and a plurality of user devices, including the user device(s) 120 and/or one or more other devices.

In some demonstrative embodiments, the user devices 120 and/or the AP 102 may be configured to communicate over a next generation 60 GHz (NG60) network, an extended DMG (EDMG) network, and/or any other network. For example, the user devices 120 and/or the AP 102 may be configured to communicate MIMO transmissions (e.g., DL MU-MIMO) and/or use channel bonding for communicating over the NG60 and/or EDMG networks.

In some demonstrative embodiments, the user devices 120 and/or the AP 102 may be configured to support one or more mechanisms and/or features (e.g., channel bonding, single user (SU) MIMO, and/or multiuser (MU) MIMO) in accordance with an EDMG standard, an IEEE 802.11ay standard, and/or any other standard and/or protocol.

In order for an AP (e.g., AP 102) to establish communication with one or more user device(s) 120 (e.g., user devices 124, 126, and/or 128), the AP 102 may communicate in a downlink direction, and the user device(s) 120 may communicate with the AP 102 in an uplink direction by sending frames in either direction. The frames may include one or more training fields that may be used for channel estimation, channel training, channel characterization, and other functions needed for establishing a channel between a transmitting device, such as an AP 102, and a receiving device, such as a user device 120.

Beamforming of beams on an antenna utilizes the training fields in order to enhance the formation of beams. These training fields may be communicated between devices (e.g., the AP 102 and/or the user device(s) 120). Beamforming depends on channel calibration procedures, called channel sounding, to determine how to radiate energy in a preferred direction. Many factors may influence how to steer a beam in a particular direction. Beamforming enables the endpoints at either side of a link to get maximum performance by taking advantage of channels that have strong performance while avoiding paths and carriers that have weak performance.

In one embodiment, and with reference to FIG. 1, a device (e.g., the user device(s) 120 and/or the AP 102) may be configured to communicate an MU-MIMO frame, for example, over a 60 GHz frequency band. For example, the AP 102 may contain one or more antenna(s) 140, which may be utilized to generate one or more beams 142 that may be directed towards one or more user devices 120. The beams may be arranged in a beam pattern 144 that is based on the direction of communication. Typically, beamforming may be accomplished physically (shaping and moving a transducer), electrically (analog delay circuitry), or mathematically (digital signal processing).

The beam pattern 144 may be pointed in a direction of communication with at least one of the user devices 120. The beam pattern 144 may be depicted by a sector angle and by a direction. That is the beam pattern 144 may have an area that may be defined by the angle spanning over the beams and by the direction of communication with at least one of the user devices 120.

In one embodiment, the angle associated with a beam pattern 144 may be increased or decreased based on whether one or more beam patterns overlap or not. This may result in widening or narrowing the coverage area of an antenna. In another embodiment, the direction of the antenna may be varied in order to increase or decrease the number of devices that are covered by the antenna. In another embodiment, polarization of an antenna may be varied in order to align or misalign one device's antenna with another device's antenna.

Figure 2:
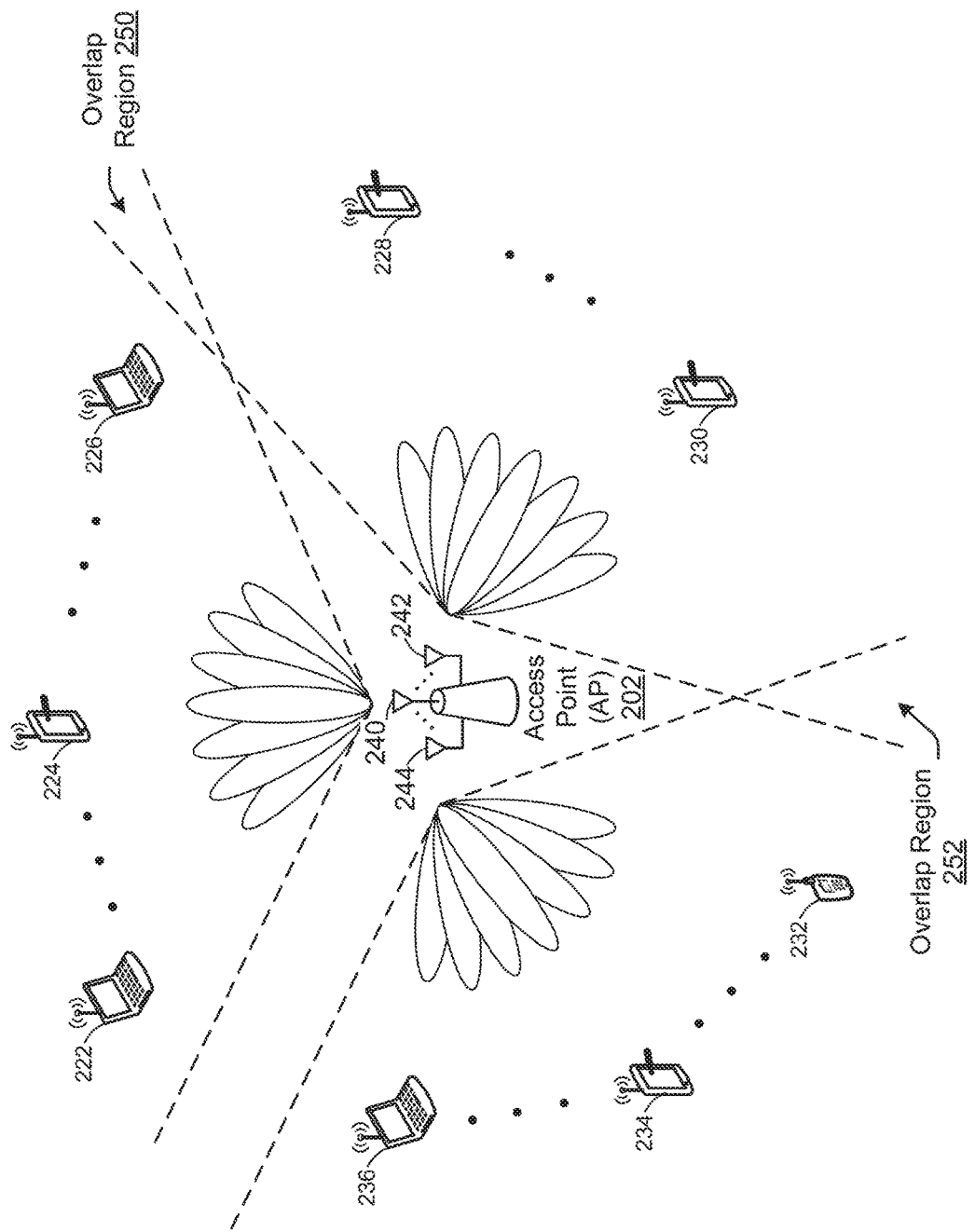
FIG. 2 depicts an illustrative schematic diagram for antenna adjustment for unsynchronized MU-MIMO communications, in accordance with one or more example embodiments of the present disclosure.

FIG. 2 depicts an illustrative schematic diagram for antenna adjustment for unsynchronized MU-MIMO communications, in accordance with some demonstrative embodiments.

As shown in FIG. 2, an AP 202 and user devices 222, 224, 226, 228, 230, 232, 234, and 236 may be in communication with each other. The AP 202 may include one or more antennas (e.g., antennas 240, 242, and 244). These antennas may be directed to various sectors, and each sectorized antenna may serve one or more user devices. Antennas 240, 242, and 244 may be arranged in such a way to cover the majority of the areas that are surrounding the AP 202. This is meant to maximize the coverage of the AP 202 by servicing as many user devices 220 as possible. In this example, by orienting the three antennas to cover various areas around the AP 202, the devices located around the AP 202 may be able to communicate using electromagnetic waves between the antennas of the user devices and the antennas of the AP 202. For example, a first group of user devices (e.g., user devices 222, 224, and 226) may be serviced by the antenna 240. A second group of user devices (e.g., user devices 228 and 230) may be serviced by the antenna 242, and a third group of user devices 220 (e.g., user devices 232, 234, and 236) may be serviced by the antenna 244. In that sense, these devices may be located in the sector, or the beam pattern area, of the respective antenna. Additionally, polarization may play a role in determining which user device communicates with which antenna of the AP 202.

In some scenarios, antenna sectors may overlap, such that a user device found in an overlap region (e.g., overlap region 250 and/or overlap region 252) may effectively receive signals (e.g., electromagnetic waves) from two different antennas. For example, the antenna 240 and the antenna 242 beam patterns or sectors may cause the overlap region 250. Similarly, the antenna 242 and the antenna 244 beam patterns or sectors may cause the overlap region 252. Consequently, these overlap regions may result in user devices receiving strong signals from both antennas resulting in interference and noise. In order to minimize the overlap regions, the unsynchronized MU-MIMO system may be configured to modify one or more features and characteristics of the antennas of the AP 202. It is understood that the above descriptions are for purposes of illustration and are not meant to be limiting.

Figures 3A, 3B:
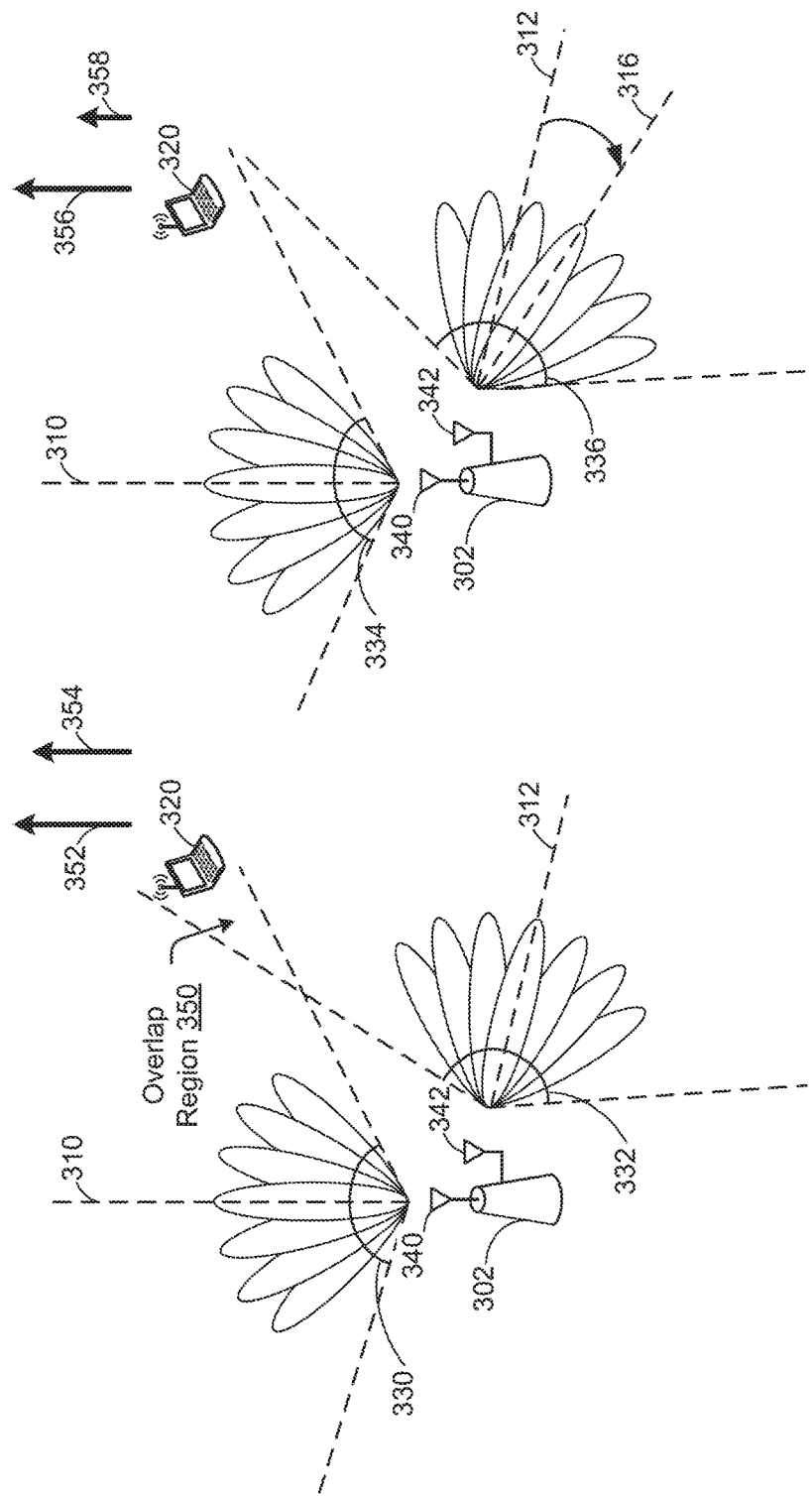
FIGS. 3A-B depict illustrative schematic diagrams for antenna adjustment for unsynchronized MU-MIMO communications, in accordance with one or more example embodiments of the present disclosure.

FIGS. 3A-B depict illustrative schematic diagrams for antenna adjustment for unsynchronized MU-MIMO communications, in accordance with one or more example embodiments of the present disclosure.

Referring to FIG. 3A, an AP 302 and a user device 320 may be in communication. The AP 302 may contain in this example two or more sectorized antennas. In this scenario, antennas 340 and 342 of the AP 302 may be oriented in different directions. For example, the center beam of antenna 340 may be oriented in direction 310, while the center beam of antenna 342 may be oriented in direction 312. The example of FIG. 3A shows that the beams of antenna 340 may have an angle 330 that defines the boundaries of its beam pattern. Further, the beams of antenna 342 may have an angle 332 that defines the boundaries of its beam pattern. The depicted beam patterns of antennas 340 and 342 result in an overlap region 350. Consequently, any user devices located in the overlap region 350 (e.g., user device 320) may receive signals from two different directions associated with two different antennas (e.g., antenna 340 and antenna 342). Typically, each user device (or STA) is associated with only one antenna of an AP.

The user device 320 may receive signals from antenna 340 and antenna 342. The user device 320 may measure one or more characteristics of the received signals from the different antennas. For example, the user device 320 may measure the signal strength of the signals received from the AP 302. As shown in FIG. 3A, the user device 320 may measure a signal strength 352 of a signal received from antenna 340. Additionally, the user device 320 may measure a signal strength 354 of a signal received from antenna 342. The user device 320 may be considered in an overlap region (e.g., overlap region 350) if both signal strengths 352 and 354 are equivalent or substantially close in value. In other words, if the difference in a power level between the signal strength 352 and the signal strength 354 is below a threshold, the user device 320 may be considered in an overlap region. If the difference in the power level between the signal strength 352 and the signal strength 354 is above a threshold, the user device may be determined not to be in an overlap region.

Referring to FIG. 3B, the AP 302 may adjust its antennas 340 and 342 in order to reduce overlap regions. In one embodiment, an unsynchronized MU-MIMO system may reduce the overlap in one or more quasi-omni areas that may be covered by different sectorized antennas. The unsynchronized MU-MIMO system may facilitate coordination between different sectors by adjusting the one or more antennas associated with a device.

In one embodiment, the unsynchronized MU-MIMO system may be configured to perform a dynamic adjustment to one or more antennas of an AP (e.g., AP 302 including AP 102 of FIG. 1) and/or one or more antennas of a user device (e.g., user device 320, including user devices 120 of FIG. 1). For example, an adjustment to angles (e.g., pseudo-quasi-omni angles) associated with one or more sectorized antennas of the one or more antennas may be made based at least in part on feedback from the STAs. Further, an adjustment to the directions of the one or more antennas may be made and/or polarization adjustment of the one or more antennas may be made based at least in part on feedback from the STAs. Consequently, interference may be reduced to favor reuse between sectorized antennas.

In the case of angle adjustments, and still referring to FIGS. 3A and 3B, angles 330 and/or 332 may be adjusted into angles 334 and 336 in order to minimize or eliminate the overlap region 350. The AP 302 may dynamically adjust angles 330 and/or 332 based at least in part on feedback received from the user device 320. For example, the user device 320 may measure, among other things, one or more signal strengths (e.g., signal strengths 352 and 354) of signals associated with the multiple beams that may be emitted from antennas 340 and 342 of the AP 302. The user device 320 may then send the measured signal strengths associated with the received signals to the AP 302. The AP 302 may utilize, at least in part, the signal strengths 352 and 354 in order to determine whether an overlap region (e.g., overlap region 350) does exist. Based on the determination that an overlap region 350 does exist, the AP 302 may perform dynamic adjustment to its antennas (e.g., antennas 340 and 342) in order to minimize or eliminate that overlap region 350. In this example, the AP 302 may have adjusted its angle 332 to become narrower as shown in angle 336, where angle 336 is smaller than angle 332. Narrowing the angle to the beam pattern may result in reducing the overlap region since the beam pattern will now have a smaller area of coverage due to the smaller or narrower angle 336. The AP 302 may continue to send signals using its various beams that may be measured at the user device 320. The user device 320 may re-measure the signal strengths and may determine the signal strength associated with antennas 340 and 342. For example, the signal strength associated with antenna 340 may be measured at the user device 320 to be signal strength 356 and the signal strength associated with antenna 342 may be measured at the user device 320 to be signal strength 358. The user device 320 may then transmit the measured signal strengths to the AP 302. The AP 302 may receive the signal strengths measurements (e.g., signal strengths 356 and 358) from the user device 320. The AP 302 may then compare the signal strength 356 to the signal strength 358 in order to determine whether the coverage of antenna 340 and antenna 342 is still contained in the overlap region. In order to make that determination, the AP 302 may compare the difference between signal strengths 356 and 358 to a predetermined threshold. The predetermined threshold may be determined by a system administrator, the AP 302, the user device 320, a network administrator, or a user of any of these devices. In case the difference between the signal strengths is greater than the predetermined threshold, the AP 302 may determine that the signal strength difference is enough to determine that no overlap or a minimal overlap between the coverage areas of antennas 340 and 342 exists. However, if the AP 302 determines that the signal strength difference is less than the predetermined threshold, the AP 302 may determine that an overlap does exist. Based on the determined overlap, the AP 302 may continue to perform dynamic adjustment to its antennas 340 and 342.

In the case of adjustment to the direction, the antenna 340 may have a direction of 310 and the antenna 342 may have a direction of 312, as seen in FIG. 3A. Since in this scenario, the AP 302 determined based on the signal strengths 352 and 354 that the user device 320 is located in an overlap region 350, the AP 302 may perform dynamic adjustments to its antennas in order to remedy that situation. The AP 302 may change the direction of one or more of its antennas. In the example of FIG. 3B, the AP 302 may adjust the direction of antenna 342 from direction 312 to direction 316. It should be understood that changing the direction of the antenna 342 may not have changed the angle of the beam pattern because only the antenna direction may have been adjusted. The user device 320 may then perform measurements of the signal strengths 356 and 358 after the AP 302 has adjusted the direction of antenna 342. The user device 320 may send the measurements to the AP 302, which in turn may determine whether additional adjustments are needed. For example, adjustments to the direction of antenna 342 may be performed if the difference between the measurements is within the predetermined threshold. If additional adjustments to the direction of antenna 342 (or antenna 340, or any other antennas of the AP 302) are needed, the AP 302 may continue to adjust the direction of its antennas and continue to compare received measurements from the user device 320 until the overlap is minimized or eliminated.

The user device 320 may perform measurements associated with signals received from various antennas associated with the AP 302 based on one or more conditions. For example, the measurements may be performed periodically, based on a request received from the AP 302, or initiated by the user device 320.

It should be understood that during deployment of an AP 302, angles and/or antenna directions may have been preconfigured. Therefore, it may be difficult to adjust the angles of, for example, pseudo-quasi-omnidirectional antennas after deployment of the AP 302. An unsynchronized MU-MIMO system in accordance with the one or more embodiments described in the present disclosure may dynamically adjust angles, directions, and/or polarization of antennas in order to minimize overlaps, even after deployment of an AP.

It is understood that the above descriptions are for purposes of illustration and are not meant to be limiting.

Figure 4:
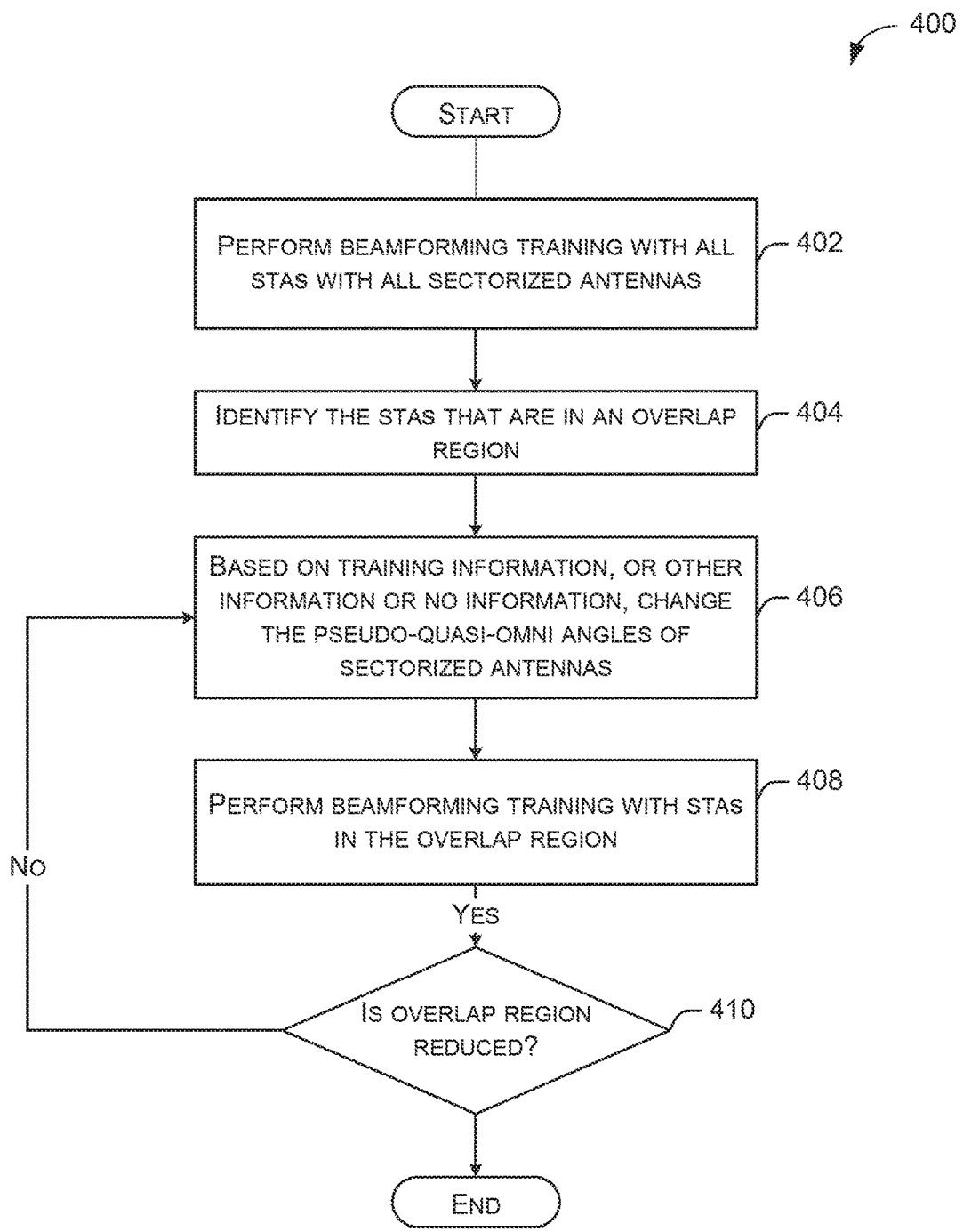
FIG. 4 depicts a flow diagram of an illustrative process for antenna adjustment for unsynchronized MU-MIMO communications, in accordance with one or more example embodiments of the present disclosure.

FIG. 4 illustrates a flow diagram of an illustrative process 400 for antenna adjustment for unsynchronized MU-MIMO communications, in accordance with some demonstrative embodiments.

At block 402, a device (e.g., the user device(s) 120 and/or the AP 102 of FIG. 1) may perform beamforming training with one or more other devices (e.g., the user device(s) 120 and/or the AP 102 of FIG. 1), with all antennas associated with the device. For example, an AP may have one or more antennas and may wish to communicate with one or more user devices that may be located within the antenna sectors of the AP's antennas. The AP utilizes beamforming training in order to identify the user devices in the various antenna sectors. For example, the AP may send one or more frames to the user devices. The one or more frames may contain training fields that may be used for channel estimation, channel training, channel characterization, and other functions needed for establishing a channel between the AP and the user devices.

At block 404, the device may identify one or more devices located in an overlap region. For example, an AP may receive feedback from at least one user device. The feedback may include measurements associated with signals that may be received at the user device where signals are associated with particular antennas. For example, a first measurement of a first signal received from a first antenna of the AP may be compared to a second measurement of a second signal received from a second antenna of the AP. That is, the user device may compare signals associated with different antennas of an AP and determine whether the measurements are indicative of the user device being located in an overlap region. An overlap region may be defined as a region where signals may be received from different antennas associated with the AP. The measurements may include at least in part signal strength, power measurements, training information, or other information associated with signals received at the user device. For example, a received signal strength indicator (RSSI) is a measurement of the power present in a received radio signal which may be used for comparison. For example, if the user device measures the RSSIs of signals received from various antennas associated with the AP, the user device may transmit these measurements to the AP. The AP may utilize those measurements to determine whether the user device is present in an overlap region between the antennas.

At block 406, based on the measurements, training information, other information, or in some scenarios, no information received from the user device, the AP may perform adjustments to its antennas in order to minimize or eliminate the overlap region. The adjustments may include one or more of an antenna angle adjustment, an antenna direction adjustment, or an antenna polarization adjustment. The antenna angle adjustment may include varying the angle of the beam pattern of an antenna. The antenna direction adjustment may include varying the direction the antenna is pointed to. The antenna polarization adjustment may include varying the polarization of the radiated fields produced by the antenna.

At block 408, the AP may perform beamforming training again with the user device that was present in the overlap region in order to determine whether additional adjustments are needed in order to minimize or eliminate the overlap region. In that scenario, the AP and the user device may send one or more frames that contain one or more training fields that may be used for channel estimation, channel training, channel characterization, and other functions needed for establishing a channel between the AP and the user devices. The user device will then perform various measurements and/or information that may be sent to the AP.

At block 410, the AP may utilize the feedback received from the user device in order to determine whether the overlap has been minimized or eliminated. The feedback may include measurements of RSSI signal strength, power measurements, training information, or other information associated with signals received at the user device. The user device may periodically send measurements associated with signals received from the one or more antennas of the AP. The AP would then continue to make adjustments to the antennas as needed in order to minimize or eliminate the overlap region.

Figure 5A:
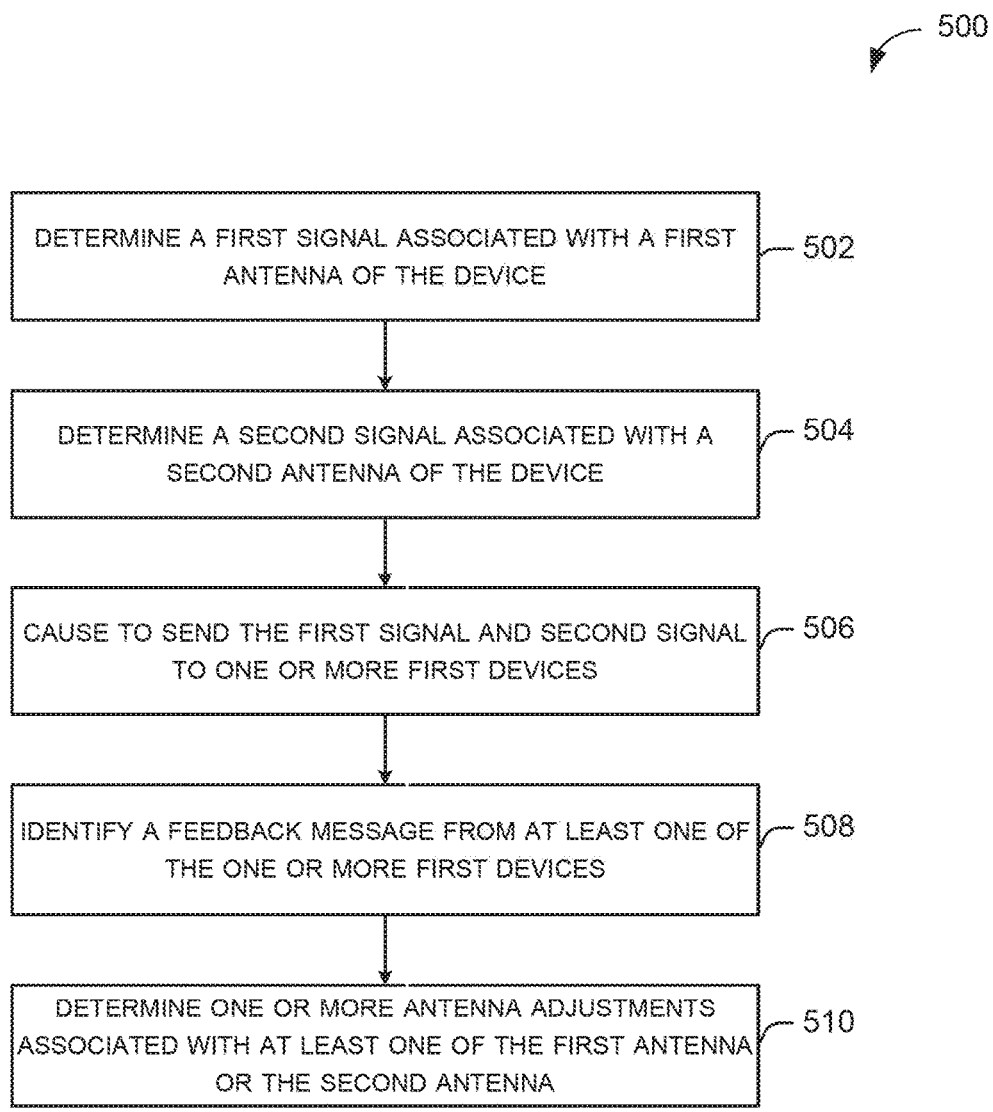
FIG. 5A depicts a flow diagram of an illustrative process for antenna adjustment for unsynchronized MU-MIMO communications, in accordance with one or more example embodiments of the present disclosure.

FIG. 5A depicts a flow diagram of an illustrative process 500 for antenna adjustment for unsynchronized MU-MIMO communications, in accordance with one or more example embodiments of the present disclosure.

At block 502, a device (e.g., the user device(s) 120 and/or the AP 102 of FIG. 1) may determine a first signal associated with a first antenna of the device. For example, if an AP has three antennas, the AP may send a first signal towards a user device. The first signal may be a beamforming training signal sent from the AP to the user device (or vice versa). When the user device receives the first signal, the user device may perform measurements associated with the first signal. For example, the user device may determine the RSSI of the first signal.

At block 504, the device may determine a second signal associated with a second antenna of the device. Continuing with the above scenario, the user device may receive a second signal associated with a second antenna of the AP. This may occur when the sectors covered by the first antenna and the second antenna may overlap, such that a user device may receive signals from two antennas of the AP. At block 506, the device may cause to send the first signal and second signal to one or more first devices. Since the user device may communicate using one antenna from the AP, the second signal received on the second antenna may cause interference with the first signal at the user device. The user device may be in a region that is an overlap region between the two sectors of the first antenna and the second antenna. In that overlap region, signals from two antennas may be received at the user device. The user device may then perform measurements on the received first signal and second signal in order to determine, for example, the power level of these signals. The measurements may include at least one of a received signal strength indicator (RSSI) measurement, training information, or power measurements associated with the user devices. For example, the user device may determine a first RSSI for the received first signal and a second RSSI for the received second signal. The user device may send the measurements associated with the received first signal and second signal to the AP such that the AP is able to perform one or more actions based on the measurements. The user device may send the measurements in mechanisms such as encoding and/or signaling, etc. For example, the user device may encode the measurements into a message (e.g., a feedback message) using encoding mechanisms that encapsulate the information contained in the measurements into one or more formats in accordance with one or more communication standards. The user device may utilize signaling in order to send one or more signals indicating the measurements.

At block 508, the device may identify a feedback message from at least one of the one or more first devices. The AP may receive the feedback message that may include the measurements captured by the user device based on the received first signal and second signal. The AP may decode the information included in the feedback message in order to extract the measurements associated with the first signal and the second signal. The measurements may assist the AP in adjusting certain parameters associated with the first antenna and second antenna that originated the first signal and the second signal respectively.

At block 510, the device may determine one or more antenna adjustments associated with at least one of the first antenna or the second antenna. The AP may utilize the measurements received from the user device in order to perform one or more antenna adjustments. For example, the AP may determine that the first RSSI and the second RSSI are within a certain threshold from each other and, based on that determination, the AP may determine whether to perform the one or more antenna adjustments or not. The threshold may be set to determine if the power level difference between the two RSSI values is low enough to merit the one or more antenna adjustments or whether the power level difference between the two RSSI values is large enough so that no adjustments are needed. For example, if the first signal received at the user device had a first RSSI that is close in value to the second RSSI or lower than the threshold value, the AP may determine that the first signal and the second signal may be interfering with each other. The AP may also determine that because the two RSSI values are lower than the threshold value, the user device may be located in an overlap region such that signals received from the second antenna may be interfering with signals received from the first antenna. In this scenario, it is assumed that the user device and the AP are meant to communicate on the first antenna and not the second antenna. The AP may then perform the one or more antenna adjustments in order to minimize or eliminate the overlap region and hence the interference between the first signal and the second signal. However, if the AP determines that the two RSSI values are not close in value such that the difference between the first RSSI value and the second RSSI value is larger than the threshold, the AP may not need to perform any adjustments. This may indicate to the AP that the overlap region is negligible or nonexistent.

Figure 5B:
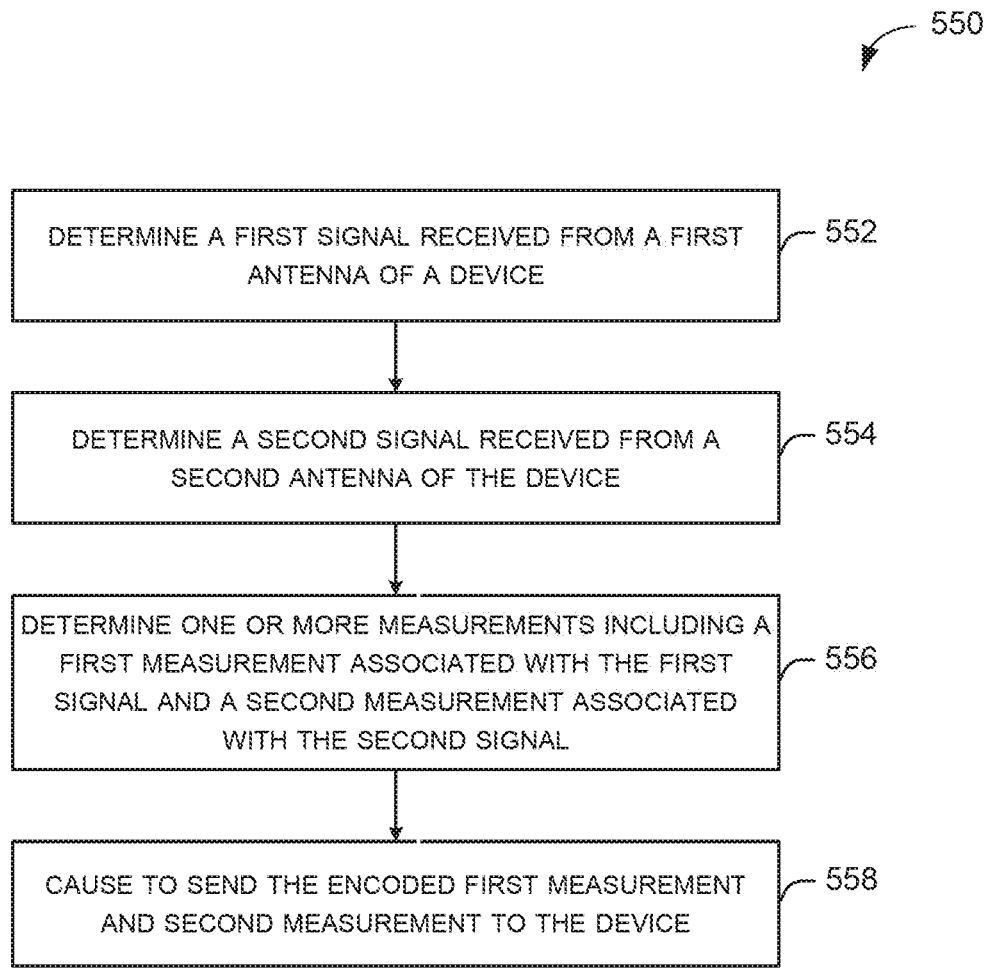
FIG. 5B depicts a flow diagram of an illustrative process for antenna adjustment for unsynchronized MU-MIMO communications, in accordance with one or more example embodiments of the present disclosure.

FIG. 5B depicts a flow diagram of an illustrative process 550 for antenna adjustment for unsynchronized MU-MIMO communications, in accordance with one or more example embodiments of the present disclosure.

At block 552, a device (e.g., the user device(s) 120 and/or the AP 102 of FIG. 1) may determine a first signal received from a first antenna of a device (e.g., the user device(s) 120 and/or the AP 102 of FIG. 1). For example, a user device (e.g., the user device 120 of FIG. 1) may receive the first signal from an AP. The first signal may be a beamforming training signal or any other signal that may be received by the user device. The first signal may be sent using a first antenna on the AP. The user device and the AP may have established a communication between each other using the first antenna. The first signal may be associated with one or more characteristics that may be used for determining one or more measurements at the user device. For example, the user device may determine the RSSI of the first signal, or it may determine other measurements.

At block 554, the user device may determine a second signal received from a second antenna of the AP. The second signal may have been unintended for the user device. However, the second signal may have been received by the user device. The second signal received from the second antenna of the AP may cause interference with the first signal at the user device. The user device may be determined to be in a region that is an overlap region between the two sectors covered by the first antenna and the second antenna of the AP. Since the user device is determined to be in an overlap region, then the user device may receive signals from separate antennas (e.g., the first antenna and the second antenna).

At block 556, the user device may determine one or more measurements including a first measurement associated with the first signal and a second measurement associated with the second signal. The measurements may include at least one of an RSSI measurement, training information, or power measurements associated with the user device. For example, the user device may perform a measurement of a first RSSI associated with the first signal and a measurement of a second RSSI associated with the second signal. The user device may determine the measurements, which may assist the AP in performing additional operations based on these measurements. For example, the user device may utilize the first RSSI and the second RSSI to inform the AP of these values. The user device may encode the first measurement and the second measurement into a first feedback message. The user device may utilize encoding mechanisms that might encapsulate the information contained in the measurements into one or more formats in accordance with one or more communication standards. The user device may also utilize signaling in order to send one or more signals to the AP indicating the measurements.

At block 558, the user device may cause to send the encoded first measurement and second measurement to the AP. The user device may send these measurements using a feedback message, or any other mechanisms to deliver messages or signals to the AP. The AP may receive the feedback message containing the measurements associated with the first signal and the second signal received at the user device. The AP may then utilize that information in order to determine whether to perform antenna adjustments associated with the first antenna or the second antenna. For example, the AP may determine whether the first RSSI and the second RSSI fall within a threshold before determining to perform the antenna adjustments. For example, if the difference between the first RSSI and the second RSSI is negligible, the AP may determine that the user device is located in an overlap region such that signal strengths (e.g., the first RSSI and the second RSSI) are close enough to warrant an antenna adjustment in order to minimize or eliminate the overlap region. Minimizing or eliminating the overlap region may minimize the interference of signals received from different antennas on the AP. However, the AP may dynamically adjust the overlap region in order to prevent a gap in coverage. That is, if the AP eliminates the overlap region, the AP may introduce a gap between the two sectors of the two antennas (e.g., the first antenna and the second antenna). In that case, any user device located in this gap may not be able to receive signals intended for it from the AP. It is understood that the above descriptions are for purposes of illustration and are not meant to be limiting.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or a user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or media access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 2, 3A-3B, 4, 5A and 5B.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, the alphanumeric input device 712, and the UI navigation device 714 may be a touch screen display. The machine 700 may additionally include a storage device (i.e., drive unit) 716, a signal generation device 718 (e.g., a speaker), an antenna adjustment for unsynchronized MU-MIMO communications device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The antenna adjustment for unsynchronized MU-MIMO communications device 719 may carry out or perform any of the operations and processes (e.g., the processes 400, 500 and 550) described and shown above. For example, the antenna adjustment for unsynchronized MU-MIMO communications device 719 may be configured to facilitate coordination between different antenna sectors at a medium access control (MAC) layer independently from each other. That is the antenna adjustment for unsynchronized MU-MIMO communications device 719 may facilitate the independent communication between an AP and multiple STAs using multiple antennas.

The antenna adjustment for unsynchronized MU-MIMO communications device 719 may be configured to facilitate dynamically setting the angles of one or more antennas (e.g., pseudo-quasi-omni angles) of each sectorized antenna of the one or more antennas based at least in part on feedback received from the multiple STAs. For example, the pseudo-quasi-omni angles may be set based at least in part on feedback (e.g., measurements) from one or more STAs that may be associated with the AP.

The antenna adjustment for unsynchronized MU-MIMO communications device 719 may reduce the overlap in one or more quasi-omni areas that may be covered by different sectorized antennas.

The antenna adjustment for unsynchronized MU-MIMO communications device 719 may facilitate adjusting the angles of one or more antennas (e.g., pseudo-quasi-omni angles) in order to manipulate and reduce the overlap in the one or more quasi-omni areas. Consequently, interference may be reduced to favor reuse between the sectorized antennas.

It is understood that the above functions are only a subset of what the antenna adjustment for unsynchronized MU-MIMO communications device 719 may be configured to perform and that other functions included throughout this disclosure may also be performed by the antenna adjustment for unsynchronized MU-MIMO communications device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes (e.g., processes 400, 500 and 550) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V)

device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include at least one memory that stores computer-executable instructions; and at least one processor configured to access the at least one memory, wherein the at least one processor is configured to execute the computer-executable instructions to: determine a first signal associated with a first antenna; determine a second signal associated with a second antenna; cause to send the first signal and the second signal to one or more first devices; identify a feedback message from at least one of the one or more first devices; and determine one or more antenna adjustments associated with at least one of the first antenna or the second antenna.

The implementations may include one or more of the following features. The one or more antenna adjustments include at least one of an antenna angle adjustment, an antenna direction adjustment, or an antenna polarization adjustment. The least one processor may be further configured to execute the computer-executable instructions to: determine a first antenna angle associated with the first antenna; determine a second antenna angle associated with the second antenna; and determine an overlap region based at least in part on the first antenna angle and the second antenna angle. The at least one processor may be further configured to execute the computer-executable instructions to determine the overlap region based at least in part on the feedback message received from at least one of the one or more first devices. The feedback message includes at least in part one or more measurements taken at the at least one of the one or more first devices. The one or more measurements include at least one of received signal strength indicator (RSSI) measurement, training information, or power measurements associated with the at least one of the one or more first devices. The at least one processor may be further configured to execute the computer-executable instructions to: determine a first measurement associated with the first antenna; determine a second measurement associated with the second antenna; and determine a difference between the first measurement and the second measurement. The at least one processor may be further configured to execute the computer-executable instructions to: determine the difference is greater than a predetermined threshold; determine the overlap region based at least in part on the difference; and determine the one or more antenna adjustments associated with at least one of the first antenna or the second antenna based at least in part on the overlap region. The device may further include a transceiver configured to transmit and receive wireless signals. The device may further include one or more antennas coupled to the transceiver.

According to example embodiments of the disclosure, there may be a non-transitory computer-readable medium storing computer-executable instructions which, when executed by a processor, cause the processor to perform operations. The operations may include determining a first signal received from a first antenna of a device; determining a second signal received from a second antenna of the device; determining one or more measurements including a first measurement associated with the first signal and a second measurement associated with the second signal; and causing to send the one or more measurements to the device.

The implementations may include one or more of the following features. The one or more measurements include at least one of received signal strength indicator (RSSI) measurement, training information, or power measurements. The one or more measurements are performed periodically. The computer-executable instructions cause the processor to further perform operations comprising: identifying a third signal received from the device; identifying a fourth signal received from the device; determining a third measurement associated with the third signal; determining a fourth measurement associated with the fourth signal; and causing to a second feedback message to the device. The third signal and the fourth signal are received after the first signal and the second signal.

According to example embodiments of the disclosure, there may include a method. The method may include determining a first signal associated with a first antenna; determining a second signal associated with a second antenna; causing to send the first signal and the second signal to one or more first devices; identifying a feedback message from at least one of the one or more first devices; and determining one or more antenna adjustments associated with at least one of the first antenna or the second antenna.

The implementations may include one or more of the following features. The one or more antenna adjustments include at least one of an antenna angle adjustment, an antenna direction adjustment, or an antenna polarization adjustment. The at least one processor is further configured to execute the computer-executable instructions to: determining a first antenna angle associated with the first antenna; determining a second antenna angle associated with the second antenna; and determining an overlap region based at least in part on the first antenna angle and the second antenna angle. The method may further include determining the overlap region based at least in part on the feedback message received from at least one of the one or more first devices. The feedback message includes at least in part one or more measurements taken at the at least one of the one or more first devices. The one or more measurements include at least one of received signal strength indicator (RSSI) measurement, training information, or power measurements associated with the at least one of the one or more first devices. The method may further include: determining a first measurement associated with the first antenna; determining a second measurement associated with the second antenna; and determining a difference between the first measurement and the second measurement. The method may further include: determining the difference is greater than a predetermined threshold; determining the overlap region based at least in part on the difference; and determining the one or more antenna adjustments associated with at least one of the first antenna or the second antenna based at least in part on the overlap region.

In example embodiments of the disclosure, there may be an apparatus. The apparatus may include means for determining a first signal associated with a first antenna. The apparatus may include means for determining a second signal associated with a second antenna. The apparatus may include means for causing to send the first signal and the second signal to one or more first devices. The apparatus may include means for identifying a feedback message from at least one of the one or more first devices. The apparatus may include means for determining one or more antenna adjustments associated with at least one of the first antenna or the second antenna.

The implementations may include one or more of the following features. The one or more antenna adjustments include at least one of an antenna angle adjustment, an antenna direction adjustment, or an antenna polarization adjustment. The apparatus may include means for determining a first antenna angle associated with the first antenna; means for determining a second antenna angle associated with the second antenna; and means for determining an overlap region based at least in part on the first antenna angle and the second antenna angle. The implementations may include one or more of the following features. The apparatus may further include means for determining the overlap region based at least in part on the feedback message received from at least one of the one or more first devices. The feedback message includes at least in part one or more measurements taken at the at least one of the one or more first devices. The one or more measurements include at least one of received signal strength indicator (RSSI) measurement, training information, or power measurements associated with the at least one of the one or more first devices. The apparatus may further include means for determining a first measurement associated with the first antenna. The apparatus may include means for determining a second measurement associated with the second antenna. The apparatus may include means for determining a difference between the first measurement and the second measurement. The apparatus may include means for determining the difference is greater than a predetermined threshold. The apparatus may include means for determining the overlap region based at least in part on the difference. The apparatus may include means for determining the one or more antenna adjustments associated with at least one of the first antenna or the second antenna based at least in part on the overlap region.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
   at least one memory that stores computer-executable instructions; and
   at least one processor configured to access the at least one memory, wherein the at least one processor is configured to execute the computer-executable instructions to:
   determine a first signal associated with a first antenna of the device;
   determine a second signal associated with a second antenna of the device;
   determine a difference between a first measurement associated with the first antenna and a second measurement associated with the second antenna;
   determine an overlap region based on a first antenna angle associated with the first antenna and a second antenna angle associated with the second antenna;
   cause to send the first signal and the second signal to one or more first devices;
   identify a feedback message from at least one of the one or more first devices; and
   determine one or more antenna adjustments associated with at least one of the first antenna or the second antenna.

2. The device of claim 1, wherein the one or more antenna adjustments include at least one of an antenna angle adjustment, an antenna direction adjustment, or an antenna polarization adjustment.

3. The device of claim 1, wherein the at least one processor is further configured to execute the computer-executable instructions to determine the overlap region based at least in part on the feedback message received from at least one of the one or more first devices.

4. The device of claim 1, wherein the feedback message includes at least in part one or more measurements taken at the at least one of the one or more first devices.

5. The device of claim 4, wherein the one or more measurements include at least one of received signal strength indicator (RSSI) measurement, training information, or power measurements associated with the at least one of the one or more first devices.

6. The device of claim 1, wherein the at least one processor is further configured to execute the computer-executable instructions to:
   determine the difference is greater than a predetermined threshold;
   determine the overlap region based at least in part on the difference; and
   determine the one or more antenna adjustments associated with at least one of the first antenna or the second antenna based at least in part on the overlap region.

7. The device of claim 1, further comprising a transceiver configured to transmit and receive wireless signals.

8. The device of claim 7, further comprising one or more antennas coupled to the transceiver.

9. A non-transitory computer-readable medium storing computer-executable instructions which when executed by one or more processors result in performing operations comprising:
   determining a first signal received from a first antenna of a device;
   determining a second signal received from a second antenna of the device;
   determining a difference between a first measurement associated with the first antenna and a second measurement associated with the second antenna;
   determining an overlap region based on a first antenna angle associated with the first antenna and a second antenna angle associated with the second antenna;
   determining one or more measurements including a first measurement associated with the first signal and a second measurement associated with the second signal; and
   causing to send the one or more measurements to the device.

10. The non-transitory computer-readable medium of claim 9, wherein the one or more measurements include at least one of received signal strength indicator (RSSI) measurement, training information, or power measurements.

11. The non-transitory computer-readable medium of claim 9, wherein the one or more measurements are performed periodically.

12. The non-transitory computer-readable medium of claim 9, wherein the computer-executable instructions cause the processor to further perform operations comprising:
   identifying a third signal received from the device;
   identifying a fourth signal received from the device;
   determining a third measurement associated with the third signal;
   determining a fourth measurement associated with the fourth signal; and
   causing to send a second feedback message to the device.

13. The non-transitory computer-readable medium of claim 12, wherein the third signal and the fourth signal are received after the first signal and the second signal.

14. A method comprising:
   determining, by one or more processors, a first signal associated with a first antenna;
   determining, by the one or more processors, a second signal associated with a second antenna;
   determining a difference between a first measurement associated with the first antenna and a second measurement associated with the second antenna;
   determining an overlap region based on a first antenna angle associated with the first antenna and a second antenna angle associated with the second antenna;
   causing to send, by the one or more processors, the first signal and the second signal to one or more first devices;
   identifying, by the one or more processors, a feedback message from at least one of the one or more first devices; and
   determining, by the one or more processors, one or more antenna adjustments associated with at least one of the first antenna or the second antenna.

15. The method of claim 14, wherein the one or more antenna adjustments include at least one of an antenna angle adjustment, an antenna direction adjustment, or an antenna polarization adjustment.

16. The method of claim 14, wherein the feedback message includes at least in part one or more measurements taken at the at least one of the one or more first devices.

17. The method of claim 14, further comprising determining the overlap region based at least in part on the feedback message received from at least one of the one or more first devices.

* * * * *